(12) United States Patent
Sato

(10) Patent No.: US 12,246,541 B2
(45) Date of Patent: Mar. 11, 2025

(54) RECORDING DEVICE AND RECORDING METHOD

(71) Applicant: SEIKO EPSON CORPORATION, Tokyo (JP)

(72) Inventor: Hiroki Sato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 195 days.

(21) Appl. No.: 18/188,505

(22) Filed: Mar. 23, 2023

(65) Prior Publication Data

US 2023/0302818 A1 Sep. 28, 2023

(30) Foreign Application Priority Data

Mar. 25, 2022 (JP) ................. 2022-049460

(51) Int. Cl.
*B41J 2/21* (2006.01)

(52) U.S. Cl.
CPC .................. *B41J 2/2135* (2013.01)

(58) Field of Classification Search
CPC ........ B41J 2/2135; B41J 2/2132; B41J 2/205; B41J 2/2052; B41J 2/2054; B41J 2/52; G06K 15/1881; H04N 1/405; H04N 1/4053
See application file for complete search history.

(56) References Cited

U.S. PATENT DOCUMENTS

| | | | |
|---|---|---|---|
| 2011/0063684 A1 | 3/2011 | Kakutani | |
| 2013/0021400 A1* | 1/2013 | Tamagawa | B41J 2/2139 347/15 |
| 2015/0375503 A1* | 12/2015 | Sato | B41J 2/2132 347/9 |
| 2016/0191747 A1* | 6/2016 | Katsuyama | B41J 2/2132 347/15 |
| 2017/0013165 A1 | 1/2017 | Katsuyama | |
| 2017/0242386 A1* | 8/2017 | Hirata | G03G 15/556 |

FOREIGN PATENT DOCUMENTS

| | | |
|---|---|---|
| JP | 2011-066594 A | 3/2011 |
| JP | 6261416 B2 | 1/2018 |

* cited by examiner

*Primary Examiner* — Kristal Feggins
(74) *Attorney, Agent, or Firm* — Global IP Counselors, LLP

(57) ABSTRACT

A recording device includes a recording head including a plurality of nozzles configured to discharge a liquid onto a medium, and a control unit configured to control the discharge of the liquid by the recording head based on recording data. The control unit is configured to execute a plurality of combined halftone processes, the combined halftone process being a combination of a plurality of halftone processes and the plurality of combined halftone processes being different from each other in mode of the combination of the plurality of halftone processes. When performing recording on the medium by executing a recording mode designated from among a plurality of the recording modes having different degrees of error in landing position of dots of the liquid on the medium, the control unit selects the combined halftone process and executes the selected combined halftone process to generate the recording data.

5 Claims, 7 Drawing Sheets

RECORDING DEVICE AND RECORDING METHOD

The present application is based on, and claims priority from JP Application Serial Number 2022-049460, filed Mar. 25, 2022, the disclosure of which is hereby incorporated by reference herein in its entirety.

BACKGROUND

1. Technical Field

The present disclosure relates to a recording device that performs a halftone process, and a recording method.

2. Related Art

Halftone processing technology is disclosed that incorporates dithering elements and error diffusion technique elements (see JP-A-2011-66594). According to JP-A-2011-66594, a halftone processing unit includes a dither mask constituted by a plurality of threshold values, a comparison unit that compares input image data with gray scale values, and an error diffusion unit that generates dot data using an error diffusion technique. The error diffusion unit controls an ease of forming dots using the error diffusion technique, based on a comparison result of the comparison unit.

The recording device has a plurality of recording modes, and can perform recording using each of the recording modes. Since characteristics related to image quality differ depending on the recording mode, a suitable halftone process also differs depending on the recording mode. Therefore, even in a configuration in which a plurality of halftone processes are performed in combination, as described above, there is room for improvement in order to perform a more appropriate halftone process.

SUMMARY

A recording device includes a recording head including a plurality of nozzles configured to discharge a liquid onto a medium, and a control unit configured to control the discharge of the liquid by the recording head based on recording data, wherein the control unit is configured to execute a plurality of combined halftone processes, the combined halftone process being a combination of a plurality of halftone processes and the plurality of combined halftone processes being different from each other in mode of the combination of the plurality of halftone processes, and when performing recording on the medium by executing a recording mode designated from among a plurality of the recording modes having different degrees of error in landing position of dots of the liquid on the medium, the control unit selects the combined halftone process, from among the plurality of combined halftone processes, in accordance with the designated recording mode, and executes the selected combined halftone process to generate the recording data.

A recording method for performing recording by causing a recording head including a plurality of nozzles configured to discharge a liquid onto a medium to discharge the liquid based on recording data includes a recording control step for performing the recording on the medium by executing a recording mode designated from among a plurality of the recording modes having different degrees of error in landing position of dots of the liquid on the medium, wherein the recording control step includes selecting a combined halftone process from among a plurality of combined halftone processes in accordance with the designated recording mode, the combined halftone process being a combination of a plurality of halftone processes and the plurality of combined halftone processes being different from each other in mode of the combination of the plurality of halftone processes, and executing the selected combined halftone process to generate the recording data.

DESCRIPTION OF EXEMPLARY EMBODIMENTS

An embodiment of the present disclosure will be described below with reference to the accompanying drawings. Note that each of the drawings is merely illustrative for describing the embodiment. Since the drawings are illustrative, proportions and shapes may not be precise, match each other, or some may be omitted.

1. Overall Description of Device Configuration

Figure 1:
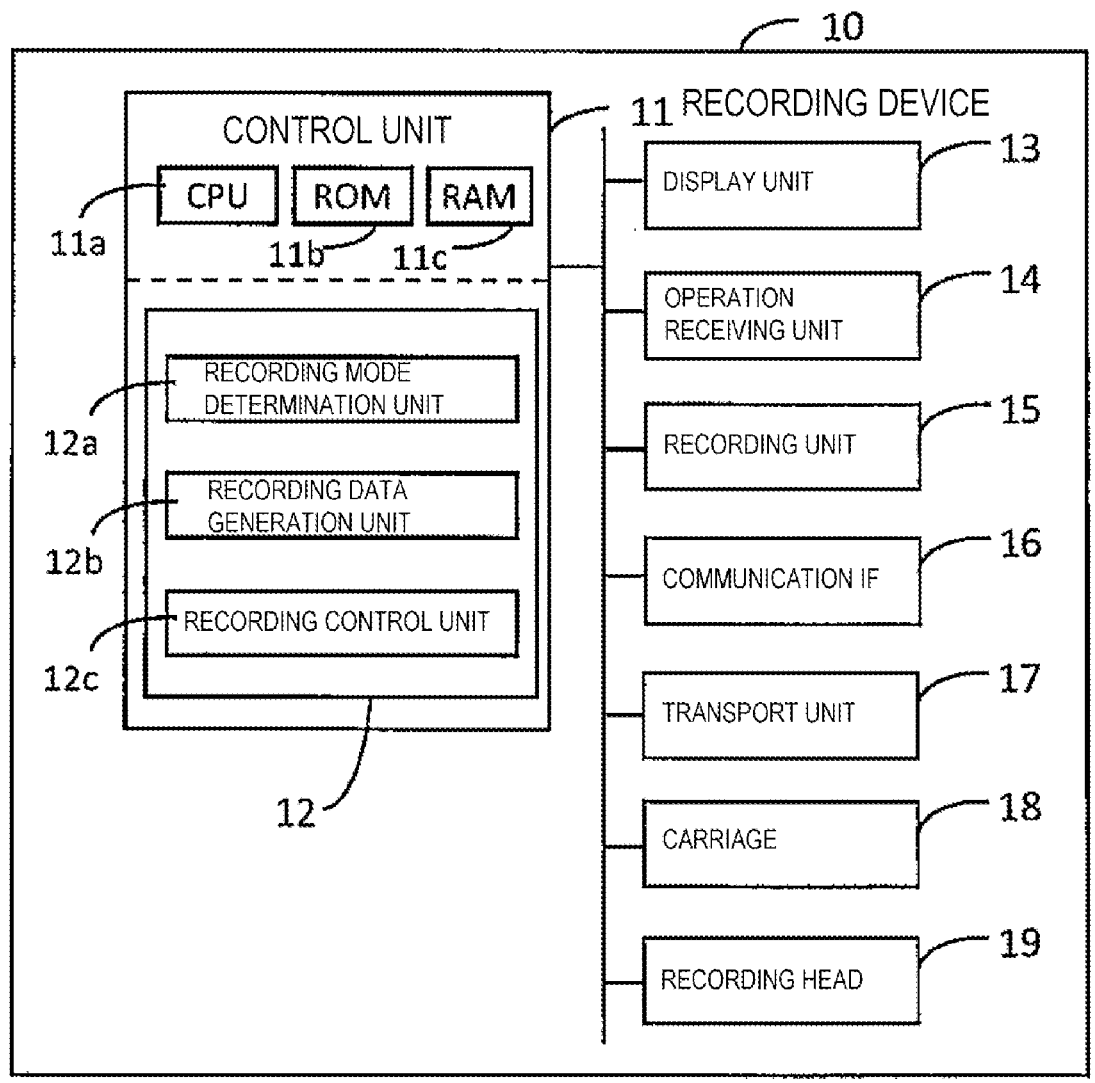
FIG. 1 is a block diagram illustrating, in a simplified manner, a configuration of a device according to an embodiment.

FIG. 1 illustrates, in a simplified manner, a configuration of a recording device 10 according to an embodiment. A recording method according to the embodiment is executed by the recording device 10.

The recording device 10 is provided with a control unit 11, a display unit 13, an operation receiving unit 14, a storage unit 15, a communication IF 16, a transport unit 17, a carriage 18, a recording head 19, and the like. IF is an abbreviation for interface. The control unit 11 is configured to include one or more ICs that include a CPU 11a as a processor, a ROM 11b, a RAM 11c, and the like, another non-volatile memory, and the like.

In the control unit 11, the processor, that is, the CPU 11a executes arithmetic processing in accordance with a program 12 stored in the ROM 11b, the other memory, or the like, using the RAM 11c or the like as a work area, to realize various functions such as a recording mode determination unit 12a, a recording data generation unit 12b, a recording control unit 12c, and the like. Note that the processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a unit that displays visual information, and is constituted, for example, by a liquid crystal display, an organic EL display, or the like. The display unit 13 may be configured to include a display, and a drive circuit for driving the display. The operation receiving unit 14 is a unit that receives an input by a user, and is realized, for example, by a physical button, a touch panel, a mouse, a keyboard, or the like. Of course, the touch panel may be realized as a function of the display unit 13. The display unit 13 and the operation receiving unit 14 may be referred to as an operation panel of the recording device 10. The display unit 13 and the operation receiving unit 14 may be part of the configuration of the recording device 10, or may be peripheral devices externally coupled to the recording device 10.

The storage unit 15 is storage unit realized, for example, by a hard disk drive, a solid state drive, or another memory. A part of the memory incorporated in the control unit 11 may be regarded as the storage unit 15. The storage unit 15 may be regarded as a part of the control unit 11.

The communication IF 16 is a generic term for one or a plurality of IFs for the recording device 10 to realize communication with an external device in a wired or wireless manner, in accordance with a prescribed communication protocol including a known communication standard. The external device is a communication device, for example, such as a personal computer, a server, smartphone, a tablet terminal, and the like.

The transport unit 17 is a unit that transports a medium 30 along a predetermined transport direction under the control of the control unit 11. The transport unit 17 is provided, for example, with rollers that rotate and transport the medium 30, a motor as a power source for the rotation, and the like. Further, the transport unit 17 may be a mechanism for transporting the medium 30 by mounting the medium 30 on a belt or a pallet moved by a motor. The medium 30 is a paper sheet, for example, but may also be a material other than paper, such as a film, fabric, or the like, as long as it is a medium on which recording can be performed using a liquid.

The carriage 18 is a movement unit that reciprocates along a predetermined main scanning direction due to driving of a carriage motor (not illustrated), under the control of the control unit 11. The main scanning direction and the transport direction intersect each other. Further, the recording head 19 is mounted on the carriage 18.

The recording head 19 is a unit that performs recording by discharging the liquid onto the medium 30 using the inkjet method under the control of the control unit 11. Although the liquid is mainly ink, the recording head 19 is also able to discharge a liquid other than the ink. Movement of the carriage 18 and movement of the recording head 19 are synonymous with each other. The carriage 18 and the recording head 19 may be understood to be the recording head 19 without being distinguished from each other.

The configuration of the recording device 10 may be realized by a single printer, or may be realized by a system including a plurality of communicatively coupled devices. For example, the recording device 10 may be a system including an information processing device responsible for the functions of the control unit 11, and a printer that includes the transport unit 17, the carriage 18, and the recording head 19, and performs recording under the control of the information processing device. In this case, the information processing device can be understood as a recording control device, an image processing device, or the like.

Figure 2:
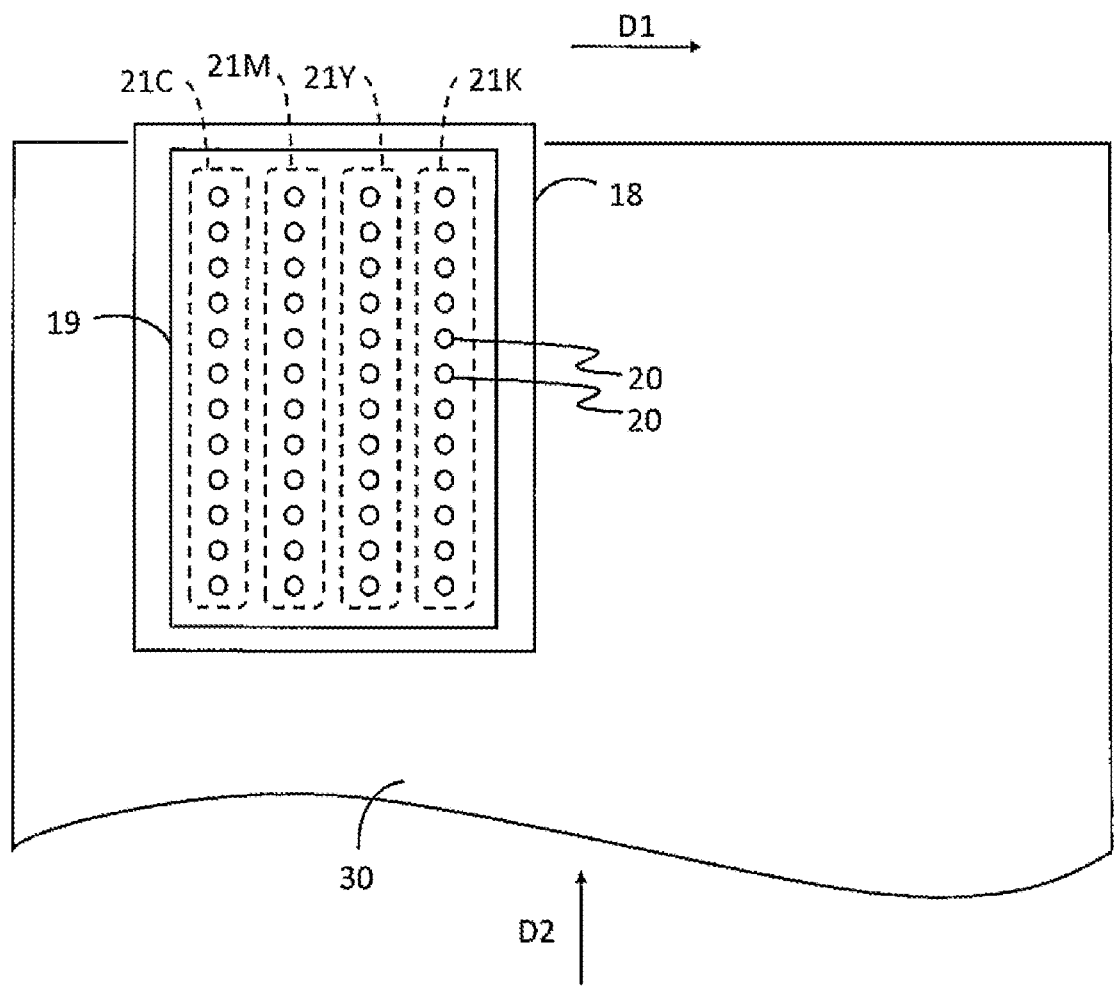
FIG. 2 is a diagram illustrating, in a simplified manner, a relationship between a medium and a recording head, as seen from above.

FIG. 2 illustrates, in a simplified manner, a relationship between the medium 30 and the recording head 19 and the like, as seen from above. As described above, the recording head 19 is mounted on the carriage 18, and, together with the carriage 18, can perform an outward movement from one end to another end along a main scanning direction D1, and a return movement from the other end to the one end. The recording head 19 includes a plurality of nozzles 20 for discharging the liquid, such as the ink. Each one of the white circles illustrated in FIG. 2 indicates the individual nozzle 20. Droplets discharged from the nozzles 20 are referred to as dots. The recording head 19 includes a nozzle group per type of liquid. The recording head 19 is capable of discharging a plurality of colors of the ink, such as cyan (C), magenta (M), yellow (Y), and black (K), for example. The recording head 19 may be referred to as a liquid discharging head, a printing head, a print head, an inkjet head, or the like.

In FIG. 2, four nozzle groups 21C, 21M, 21Y, and 21K are described in a very simple manner. Each of the nozzle groups corresponding to the one color is constituted by the plurality of nozzles 20 for which a nozzle pitch, which is an interval between the nozzles 20 in a transport direction D2, is constant or substantially constant. The main scanning direction D1 and the transport direction D2 are orthogonal or substantially orthogonal to each other. The nozzle group 21C is a nozzle row constituted by the plurality of nozzles 20 that discharge the C ink. Similarly, nozzle group 21M is a nozzle row constituted by the plurality of nozzles 20 that discharge the M ink, the nozzle group 21Y is a nozzle row constituted by the plurality of nozzles 20 that discharge the Y ink, and nozzle group 21K is a nozzle row constituted by the plurality of nozzles 20 that discharge the K ink. The recording head 19 may have a nozzle group corresponding to a color ink other than CMYK or corresponding to a predetermined liquid.

In FIG. 2, a nozzle arrangement direction in which the plurality of nozzles 20 constituting the same nozzle group are arranged is parallel with the transport direction D2, but depending on the configuration of the recording head 19, the nozzle arrangement direction may obliquely intersect the transport direction D2. The transport unit 17 transports the medium 30 from upstream to downstream in the transport direction D2. Upstream and downstream in the transport direction are also simply referred to as upstream and downstream. The plurality of nozzle groups including the nozzle groups 21C, 21M, 21Y, and 21K included in the recording head 19 are aligned along the main scanning direction D1, and the position of each is the same in the transport direction D2.

The control unit 11 causes the recording head 19 to discharge the ink onto the medium 30 based on recording data representing an image. As is known, in the recording head 19, a drive element is provided for each of the nozzles 20, and the image represented by the recording data is recorded on the medium 30 as a result of each of the nozzles 20 discharging the dot or not discharging the dot, by controlling the application of the drive signal to the drive element of each of the nozzles 20 in accordance with the recording data. With reference to the configuration illustrated in FIG. 2, the recording data is data that defines dot discharge or dot non-discharge per pixel and for each of the CMYK inks. Dot discharge is also referred to as dot-on, and dot non-discharge is also referred to as dot-off.

The liquid discharge by the recording head 19 performed in accordance with the movement of the carriage 18 is sometimes referred to as a "pass" and sometimes referred to as "main scanning". The pass due to the outward movement of the carriage 18 is referred to as an outward pass, and the pass due to the return movement of the carriage 18 is referred to as a return pass. Recording performed in both outward and return passes is bi-directional recording, and recording in one of either the outward pass or the return pass is unidirectional recording.

The control unit 11 records the image represented by the recording data on the medium 30, by combining the passes by the carriage 18 and the recording head 19 in this way, and the so-called paper feed that is transport of the medium 30 by the transport unit 17 by a predetermined distance. The transport of the medium 30 by the transport unit 17 corresponds to a relative movement in the transport direction D2 between the recording head 19 and the medium 30, and this is also referred to as sub scanning.

In accordance with the recording data, the control unit 11 can vary the size of the dots discharged by the nozzle 20 by causing an amplitude, shape, and the like of the drive signal applied to the drive element of the nozzle 20 to be different. The size of the dot is the dot diameter or the volume per dot. For example, the nozzle 20 can discharge dots of three sizes, referred to as large dots, medium dots, and small dots. A size relationship is as follows: the small dot is smaller than the medium dot, and the medium dot is smaller than the large dot. The size of the dots that can be discharged by the nozzle 20 may be two types, or may be four or more types. Thus, dot-on data included in the recording data may be data indicating which of the sizes the dot-on is.

2. Recording Control Process

Figure 3:
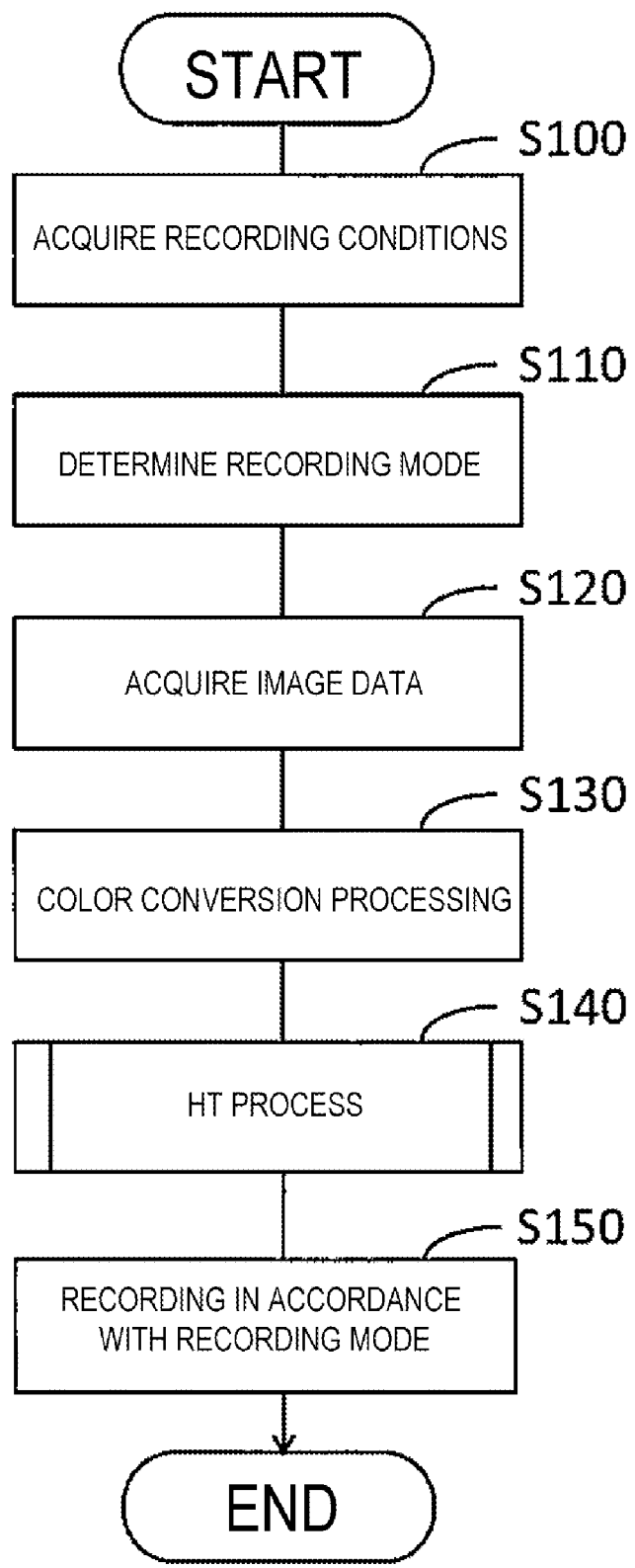
FIG. 3 is a flowchart illustrating a recording control process.

FIG. 3 illustrates, using a flowchart, a recording control process executed by the control unit 11 in accordance with the program 12. The recording control process includes a "recording control step" for performing recording on the medium 30 by executing a recording mode designated from among a plurality of recording modes having different degrees of error in landing position (hereinafter, landing error) of dots on the medium 30. The landing error is the difference between an ideal position of the dot on the medium 30 and an actual position.

At step S100, the control unit 11 acquires recording conditions for recording the image on the medium 30. In the present embodiment, the recording conditions are concepts including the recording mode. The control unit 11 has the plurality of recording modes, and can perform recording in accordance with the recording mode designated from an external source. The recording modes include, for example, a "best mode" that realizes a high image quality as a general evaluation, a "normal mode" that lowers the image quality compared to the best mode and thus shortens a time required for recording, a "quick mode" that lowers the image quality even more than the normal mode and further shortens the time required for the recording, and the like. Of course, the name or the type of the recording mode is not limited. The user can visually choose the recording mode from the name of such a recording mode even without specifying the recording conditions in detail.

The detailed recording conditions include various conditions, such as, for example, double-sided recording or single-sided recording of the medium 30, color recording or monochrome recording, margined recording or marginless recording, execution or non-execution of a rubbing avoidance measure for the medium 30, medium type, medium size, and the like. The control unit 11 can identify the single recording mode in accordance with stipulations set in advance, from a combination of the recording conditions designated from among these recording conditions. The control unit 11 acquires the recording condition, for example, through the operation receiving unit 14 and the display unit 13. In other words, the user designates the desired recording condition, including the recording mode, by an operation on a user interface screen (not illustrated) displayed on the display unit 13, and the control unit 11 acquires the designated recording condition. The recording mode determination unit 12a identifies which type of the recording mode has been designated, from the recording condition acquired in this manner. For convenience, the recording mode that has been designated is referred to as the "designated recording mode".

At step S110, the recording mode determination unit 12a of the control unit 11 determines whether the designated recording mode corresponds to a predetermined "first recording mode" having a relatively small landing error, and a predetermined "second recording mode" having a relatively large landing error. Taking the first recording mode as a reference, the second recording mode is a recording mode having a larger landing error than the first recording mode. Taking the second recording mode as a reference, the first recording mode is a recording mode having a smaller landing error than the second recording mode. Examples of factors that affect the landing error include, for example, the number of passes performed for recording a fixed region on the medium 30. Band recording is known in which the fixed region is referred to as a band, and recording of the single band is performed in one pass. Further, overlap recording is known in which recording is performed while dividing the image to be recorded in the fixed region into a plurality of passes. When comparing the recording mode where the number of passes for recording the fixed region is one, and the recording mode where the number of passes is plural, there is a strong tendency for the landing error to be greater in the recording mode in which the number of passes is plural, since displacement easily occurs between the dots recorded in the different passes.

Further, when comparing the bi-directional recording and the unidirectional recording, it is easier for displacement to occur between the dots recorded in the outward pass and the dots recorded in the return pass, and thus, there is a strong tendency for the landing error to be greater in the recording mode that employs the bi-directional recording. Further, in the recording mode that performs recording while securing a wider paper gap, which is the distance in the up-down direction between the medium 30 and the recording head 19, a flight time of the dots discharged from the recording head 19 becomes longer, and thus the landing error tends to become larger. The recording device 10 sometimes secures the paper gap wider than a given reference, when execution of the above-described rubbing avoidance measure has been specified, or depending on the medium type. In addition to the above, various factors and conditions affect the degree of landing error, such as the movement speed of the carriage 18, the transport speed of the medium 30 by the transport unit 17, the type of ink, and the like.

The number of passes with respect to the fixed region, the selection of the bi-directional or unidirectional recording, and the like are not necessarily factors designated by the user, but in any case, the various conditions and factors employed in the recording are defined in detail for each of the recording modes. As a result, the degree of landing error is different for each of the recording modes. Thus, in the present embodiment, the plurality of recording modes that can be executed by the recording device 10 are classified in advance into one of the first recording mode and the second recording mode, in accordance with the degrees of landing error. As described above, the difference in the number of passes of the recording head 19 performed with respect to the medium 30 affects the degree of landing error, and thus, as a simple example, the difference in the recording mode may be understood to be the difference in the number of such passes. In other words, the number of passes with respect to the medium 30 in the recording mode corresponding to the first recording mode is less than the number of passes with respect to the medium 30 in the recording mode corresponding to the second recording mode. Simply put, the recording mode in which the number of passes with respect to the fixed region is one is classified as the first recording mode, and the recording mode in which the number of passes with respect to the fixed region is plural is classified as the second recording mode. Further, for example, the recording mode employing the unidirectional recording may be classified as the first recording mode, and the recording mode employing the bi-directional recording may be classified as the second recording mode. The recording mode determination unit 12a may refer to a correspondence relationship established in advance between the recording mode and the classification, and may thus determine to which of the first recording mode or the second recording mode the designated recording mode corresponds.

Note that the classification of the recording mode in accordance with the degree of the landing error need not necessarily be limited to the two types of the first recording mode and the second recording mode as described above. For example, the plurality of recording modes that can be executed by the recording device 10 may be divided into three types or four or more types from the perspective of the magnitude of the landing error. The number of recording modes that can be executed by the recording device 10 may be regarded as the number of classifications as they are. However, for ease of determination, hereinafter, the description is continued assuming that the designated recording mode is classified as either the first recording mode or the second recording mode.

At step S120, the control unit 11 acquires the image data representing the image to be recorded. The control unit 11 acquires, for example, the image data designated by the user through operation of the operation receiving unit 14, from the storage unit 15 or a storage location of the image data such as the memory inside or outside the recording device 10. Alternatively, the control unit 11 receives, via the communication IF 16, the image data transmitted from the external device and thus acquires the image data.

An order of execution of steps S100, S110, and S120 need not necessarily be as illustrated in FIG. 3, and step S120 may be performed in advance of step S100 and S110, or these may be performed simultaneously or substantially simultaneously. For example, information specifying the recording condition and the image data may be included in a recording execution command transmitted to the recording device 10 from the external device, and steps S100, S110, and S120 may be completed by the control unit 11 acquiring this type of recording execution command. Further, it is sufficient that the determination as to whether the recording mode designated at step S110 is the first or the second recording mode be ended before the start of step S140 to be described below.

At step S130, the recording data generation unit 12b of the control unit 11 performs color conversion processing on the image data acquired at step S120. Of course, the recording data generation unit 12b may perform resolution conversion processing or the like on the image data as necessary. By the color conversion processing, the recording data generation unit 12b converts a value for each pixel constituting the image data to a gray scale value representing a recording amount for each liquid used by the recording head 19. This recording amount is also sometimes referred to as a recording rate, or as a duty. A color system used by the image data is not particularly limited, and, for example, the image data is RGB image data having a gray scale value of red (R), green (G), and blue (B) for each of the pixels. Further, according to the example illustrated in FIG. 2, the recording head 19 can perform the recording using the CMYK inks. In this case, the recording data generation unit 12b refers to a color conversion look-up table that defines a conversion relationship between RGB and CMYK, and converts each of the RGB gray scale values for each of the pixels of the image data to each of the CMYK gray scale values. The gray scale value is, for example, expressed in 256 gradations of 0 to 255. The color conversion look-up table is stored in advance in the storage unit 15, for example.

At step S140, the recording data generation unit 12b performs a halftone process on the image data after the color conversion processing, and generates recording data that defines dot-on or dot-off per pixel and for each of the CMYK inks. Halftone is abbreviated as HT. A "combined HT process" is a combination of a plurality of HT processes, and the recording data generation unit 12b can perform a plurality of the combined HT processes, which are different from each other in mode of the combination of the plurality of HT processes. At step S140, the recording data generation unit 12b selects the combined HT process from among the plurality of combined HT processes, in accordance with the designated recording mode, and executes the selected combined HT process to generate the recording data.

Figure 4:
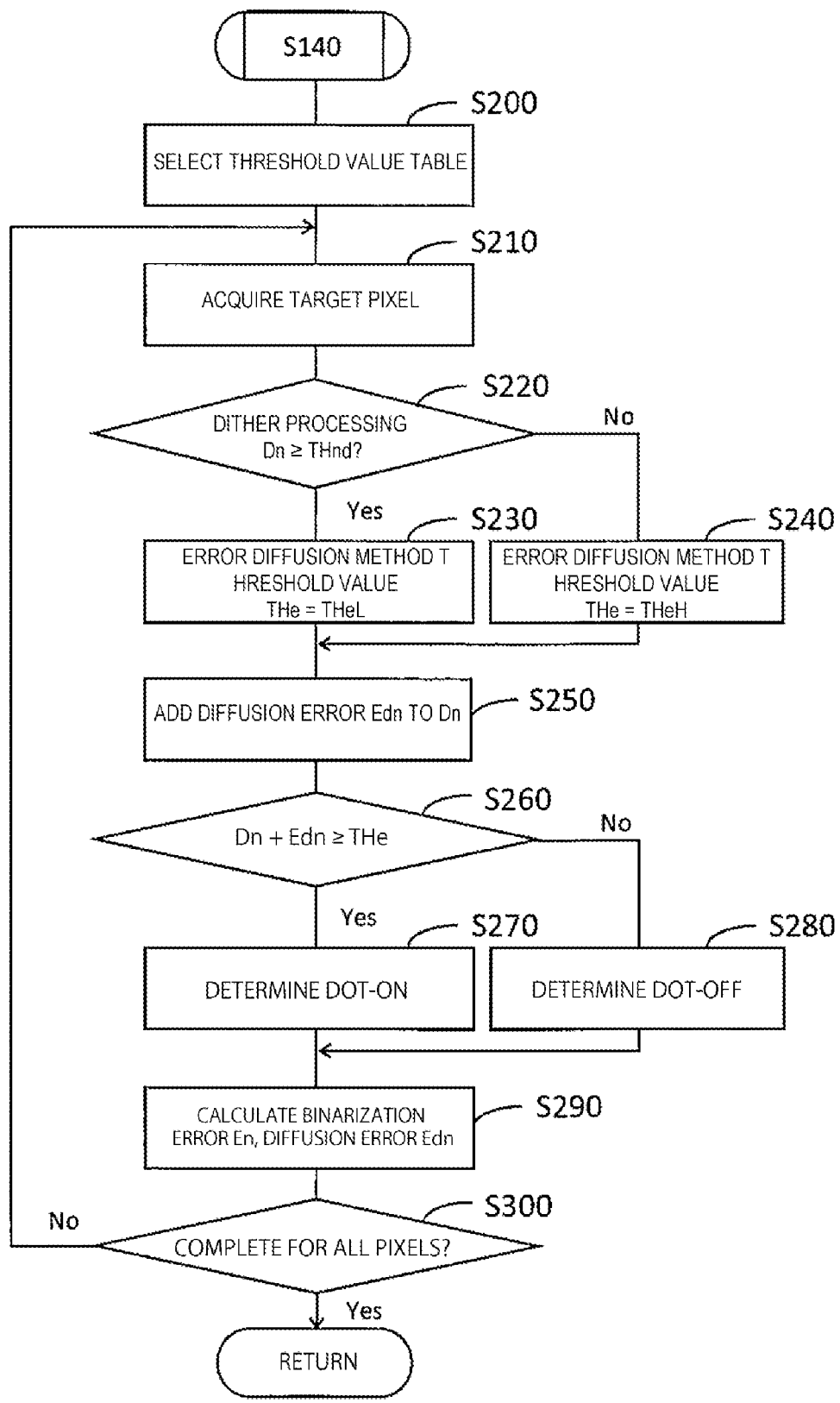
FIG. 4 is a flowchart illustrating details of step S140.

FIG. 4 illustrates step S140 in detail, using a flowchart. According to FIG. 4, the combined HT process is a process in which an HT process using a dithering technique and an HT process using an error diffusion technique are combined. At step S200, the recording data generation unit 12b selects a threshold value table, in accordance with the designated recording mode. The threshold value table is a table that defines a threshold value to be used in the HT process using the error diffusion technique, which is to be selected in accordance with a threshold value determination result using the dithering technique. In the present embodiment, a plurality of threshold value tables are stored in advance in the storage unit 15 and the like. The selection of one threshold value table from among the plurality of threshold value tables corresponds, in practical terms, to selecting one of the combined HT processes from among the plurality of combined HT processes.

As described above, the designated recording mode is determined based on whether it corresponds to either the first recording mode or the second recording mode. Here, when the designated recording mode corresponds to the first recording mode, the recording data generation unit 12b selects a predetermined "first threshold value table" from among the plurality of threshold value tables, and when the designated recording mode corresponds to the second recording mode, the recording data generation unit 12b selects a predetermined "second threshold value table" from among the plurality of threshold value tables.

At step S210, the recording data generation unit 12b acquires one pixel, of the pixels constituting the image data, as a target pixel for the combined HT process.

At step S220, the recording data generation unit 12b performs the HT process using the dithering technique (hereinafter referred to as a dither processing), with respect to the gray scale value of a given ink of the target pixel, for example, with respect to a gray scale value Dn that is a gray scale value of C. At step S210 to step S300 illustrated in FIG. 4, processing with respect to the gray scale value of the given one color of ink is described, but the same processing is also performed with respect to the gray scale values of the inks of the other colors.

In the dither processing, a so-called dither matrix, in which various threshold values are randomly arranged, is applied to the image data, to determine whether the gray scale value Dn is equal to or greater than a threshold value THnd defined in the dither matrix. The dither matrix is also stored in advance in the storage unit 15 or the like. The dither matrix may also be referred to as a dither mask. When the gray scale value Dn of the target pixel is equal to or greater than the threshold value THnd of a corresponding target pixel in the dither matrix, the recording data generation unit 12b determines "Yes", namely, determines dot-on for the target pixel, and advances the processing from step S220 to step S230. On the other hand, when the gray scale value Dn of the target pixel is less than the threshold value THnd corresponding to the position of the target pixel in the dither matrix, the recording data generation unit 12b determines "No", namely, determines dot-off for the target pixel, and advances the processing from step S22 to step S240. However, the determination of dot-on or dot-off by the dither processing is a provisional determination, and a result of the combined HT process for the target pixel is determined at steps S270 and S280 to be described below.

At step S230, the recording data generation unit 12b refers to the threshold value table selected at step S200, sets a threshold value THe, to be used in the HT process by error diffusion at steps S250 to S290, to a low threshold value THeL, and advances the processing to step S250.

On the other hand, at step S240, the recording data generation unit 12b refers to the threshold value table selected at step S200, sets the threshold value THe to a high threshold value THeH and advances the processing to step S250.

Figure 5:
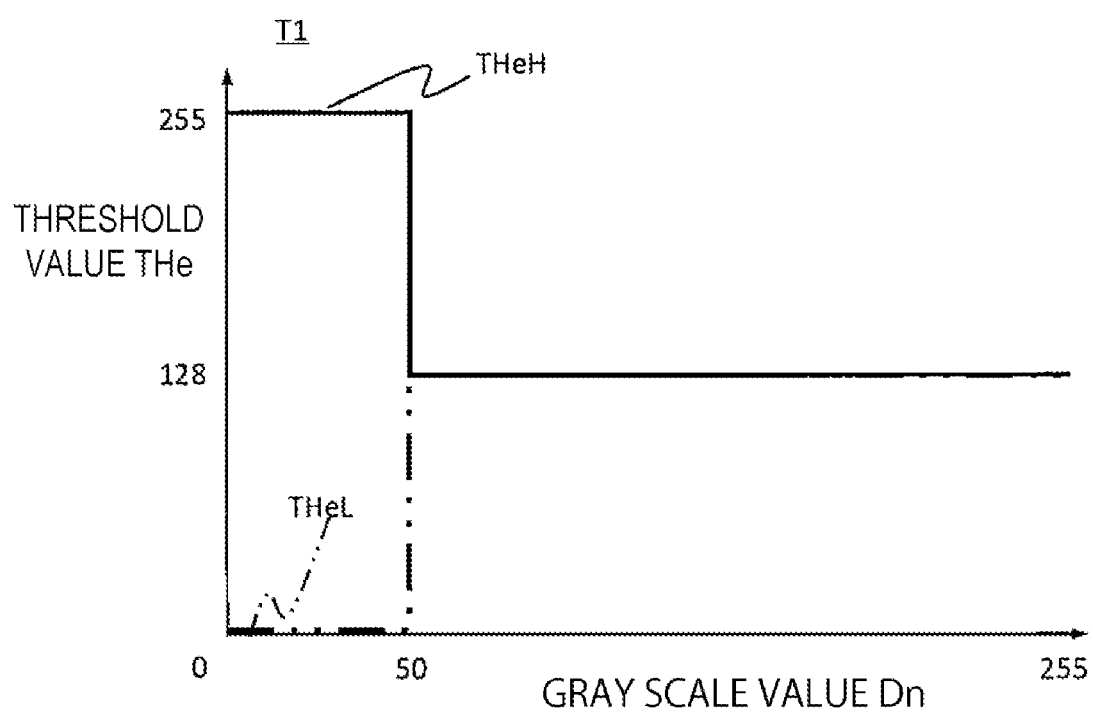
FIG. 5 is a diagram showing a first threshold value table.

FIG. 5 illustrates a first threshold value table T1 selected at step S200 when the designated recording mode is the first recording mode.

Figure 6:
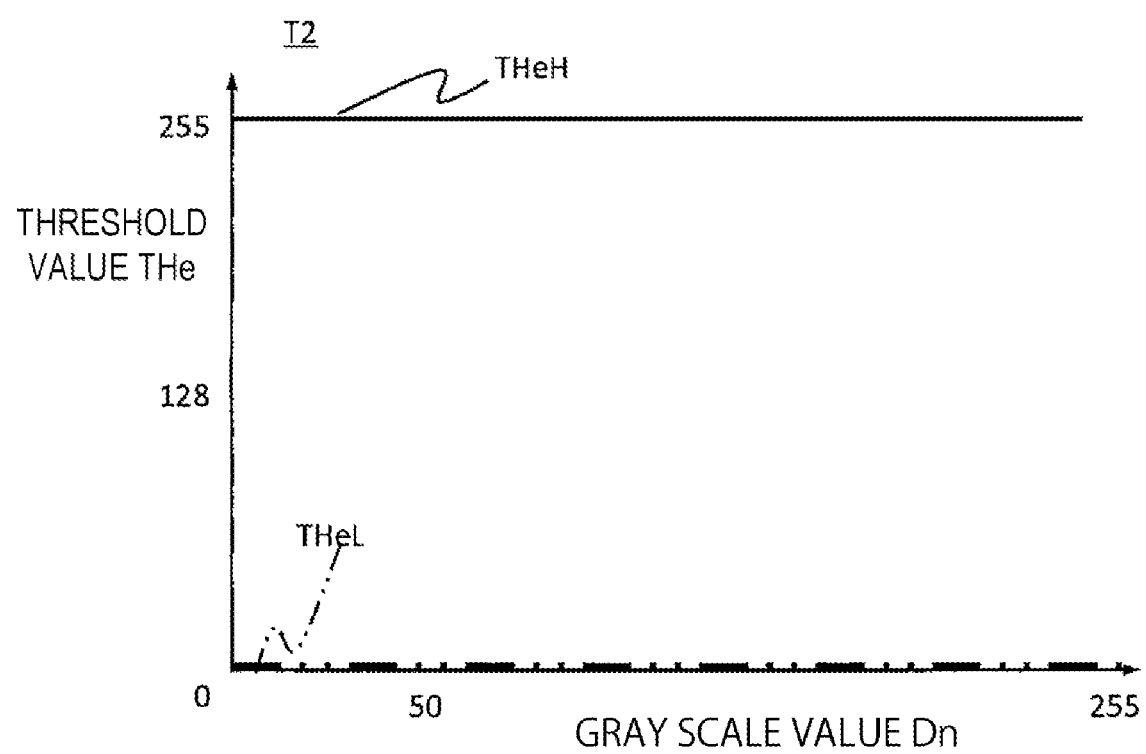
FIG. 6 is a diagram showing a second threshold value table.

FIG. 6 illustrates a second threshold value table T2 selected at step S200 when the designated recording mode is the second recording mode.

Both the threshold value tables are provided with the low threshold value THeL and the high threshold value THeH corresponding to the gray scale value Dn of the target pixel, which can be from 0 to 255. The low threshold value THeL is indicated by a two-dot chain line, and the high threshold value THeH is indicated by a solid line. In both the threshold value tables, the low threshold value THeL is equal to or less than the high threshold value THeH.

According to the first threshold value table T1, in a low gray scale range of Dn=0 to 50, the high threshold value THeH is the maximum value of 255, and the low threshold value THeL is the minimum value of zero. Further, in a gray scale range higher than the low gray scale range, the high threshold value THeH is the same as the low threshold value THeL, and is 128. Setting the upper limit gray scale value of the low gray scale range as 50 is merely an example. On the other hand, according to the second threshold value table T2, in a total gray scale range of Dn=0 to 255, the high threshold value THeH is the maximum value of 255, and the low threshold value THeL is the minimum value of zero.

The difference between the high threshold value THeH and the low threshold value THeL (hereinafter, referred to as a threshold value difference) refers to an extent of a degree of impact of the dither processing with respect to the result of the combined HT process. The greater the threshold value difference, the higher the possibility of determining dot-on when using the low threshold value THeL, and the higher the possibility of determining dot-off when using the high threshold value THeH, in the HT process by error diffusion. In other words, the greater the threshold value difference, the higher a correlation between the provisional dot-on, dot-off determination by the dither processing and a final dot-on, dot-off determination by the combined HT process. By varying the threshold value difference in this way, it is possible to vary the ways of combining the HT process using the dithering technique and the HT process using the error diffusion technique.

In the case of the low gray scale range of the first threshold value table T1 and of the second threshold value table T2, when the threshold value difference is the maximum of 255, when, through "Yes" at step S220 the low threshold value THeL is used in the HT process by error diffusion, dot-on is always determined, and when, through "No" at step S220, the high threshold value THeH is used in the HT process by error diffusion, dot-off is always determined. In other words, when the threshold value difference is the maximum, a result of the determination of dot-on, dot-off of the combined HT process is the same as the provisional determination of dot-on, dot-off by the dither processing, and the degree of impact of the dither processing with respect to the result of the combined HT process is maximized.

On the other hand, as in a case of the gray scale range higher than the low gray scale range of the first threshold value table T1, when the high threshold value THeH is the same as the low threshold value THeL, in practical terms, there is no meaning in performing the dither processing. In this case, the degree of impact of the dither processing with respect to the combined HT process is minimal, that is, the degree of impact of the HT process using the error diffusion technique with respect to the combined HT process is maximized.

In this way, selecting the first threshold value table T1 at step S200 corresponds to selecting a "first combined HT process" that, in accordance with the first recording mode, applies the HT process using the dithering technique to the low gray scale range of the recording, and applies the HT process using the error diffusion technique to the gray scale range excluding the low gray scale range. On the other hand, selecting the second threshold value table T2 at step S200 corresponds to selecting a "second combined HT process" that, in accordance with the second recording mode, applies the HT process using the dithering technique to the full gray scale range of the recording.

At step S250, the recording data generation unit 12b adds a diffusion error Edn stored in a separately prepared error buffer to the gray scale value Dn of the target pixel. The diffusion error Edn is calculated at step S290 to be described below. The gray scale value of the target pixel after adding the diffusion error Edn is described as a post-addition gray scale value Dn+En.

At step S260, the recording data generation unit 12b compares the post-addition gray scale value Dn+En with the threshold value THe set at step S230 or at step S240, which is the threshold value THe corresponding to the gray scale value Dn of the target pixel. The threshold value THe is, of course, one of the low threshold value THeL or the high threshold value THeH. When the post-addition gray scale value Dn+En is equal to or greater than the threshold value THe, from a determination of "Yes", the processing advances to step S270, determines dot-on for the target pixel, and then advances to step S290. On the other hand, when the post-addition gray scale value Dn+En is less than the threshold value THe, from a determination of "No", the processing advances to step S280, determines dot-off for the target pixel, and then advances to step S290.

At step S290, the recording data generation unit 12b calculates a binarization error En, as known, and the diffusion error Edn. The binarization error En is a difference between the post-addition gray scale value Dn+En of the target pixel and the result of the dot-on or dot-off at steps S270 and S280. Here, the binarization error En is calculated as dot-on=255, and dot-off=0. The diffusion error Edn is an error added to the gray scale value Dn of the target pixel at step S250. The recording data generation unit 12b calculates the diffusion error Edn in order to distribute the binarization error En, at a predetermined distribution ratio, to each of the pixels that are peripheral pixels to the target pixel and for which dot-on or dot-off has not yet been determined. The diffusion error Edn calculated in this way is stored in the error buffer in association with the pixel that is the distribution destination. Note that, at steps S250 to S290, binary processing that determines only the dot-on or dot-off is performed, but multivalue processing that determines one of the large dot, the medium dot, or the small dot may be performed.

At step S300, the recording data generation unit 12b determines whether the processing at steps S220 to S290 is completed for all of the pixels in the image data taken as the target pixel, and if the processing is completed, ends the flowchart illustrated in FIG. 4 as "Yes". On the other hand, when the pixels for which the processing at steps S220 to S290 is not completed remain in the image data, the recording data generation unit 12b returns to step S210 from "No" at step S300, and acquires, as the new target pixel, a pixel that has not previously been taken as the target pixel.

The description returns to the description of FIG. 3. At step S150, the recording control unit 12c of the control unit 11 starts control of the carriage 18, the recording head 19, and the transport unit 17, transfers the recording data generated by the combined HT process at step S140 to the recording head 19, and performs the recording on the medium 30 by causing the recording head 19 to discharge the dots in accordance with the recording data. Of course, this recording is performed in accordance with the designated recording mode. When the designated recording mode is different, various conditions are different, such as, for example, the amount of a single paper feed by the transport unit 17, the total number of passes performed with respect to the medium 30, whether it is the bidirectional recording or the unidirectional recording, the movement speed of the carriage 18, and the transport speed of the medium 30 by the transport unit 17. The flowchart illustrated in FIG. 3 ends here.

In this manner, when the designated recording mode is the first recording mode for which the landing error is relatively small, the recording data generation unit 12b executes the first combined HT process on the image data. According to the first combined HT process, dot-on or dot-off is determined using the dithering technique for the low gray scale range, and dot-on or dot-off is determined using the error diffusion technique for the gray scale range excluding the low gray scale range. Compared with the dithering technique, the error diffusion technique has high dot dispersion and regularity, and the graininess of the printed result is excellent. Therefore, in a situation where there is little landing error, the image quality can be effectively improved. However, when applying the HT process using the error diffusion technique to the entire gray scale range of the recording, a continuation or a concentration of dots, referred to as a worm, may occur in some of the gray scale range included in the low gray scale range. In order to suppress the generation of the worm, in the first combined HT process, the dither processing is applied to the low gray scale range rather than the error diffusion technique, and, as a result, a good image quality is achieved in all of the gray scale range.

Further, when the designated recording mode is the second recording mode for which the landing error is relatively large, the recording data generation unit 12b executes the second combined HT process on the image data. According to the second combined HT process, dot-on or dot-off is determined using the dithering technique for the entire gray scale range. The error diffusion technique exhibits an inherent effect of improving the graininess when there is no landing error, or the landing error is small. On the other hand, since the dither processing generates the dots in an irregular manner compared to the error diffusion technique, there is almost no difference in quality between when the landing error is present or when there is no landing error. Therefore, in a situation where the landing error is likely to occur, the dither processing that is strongly resistant to the landing error is applied to the entire gray scale range, and the image quality is stable even when the landing error occurs.

3. Additional Description Relating to Threshold Value Table

The threshold value table is not limited to the examples illustrated in FIGS. 5 and 6.

Figure 7:
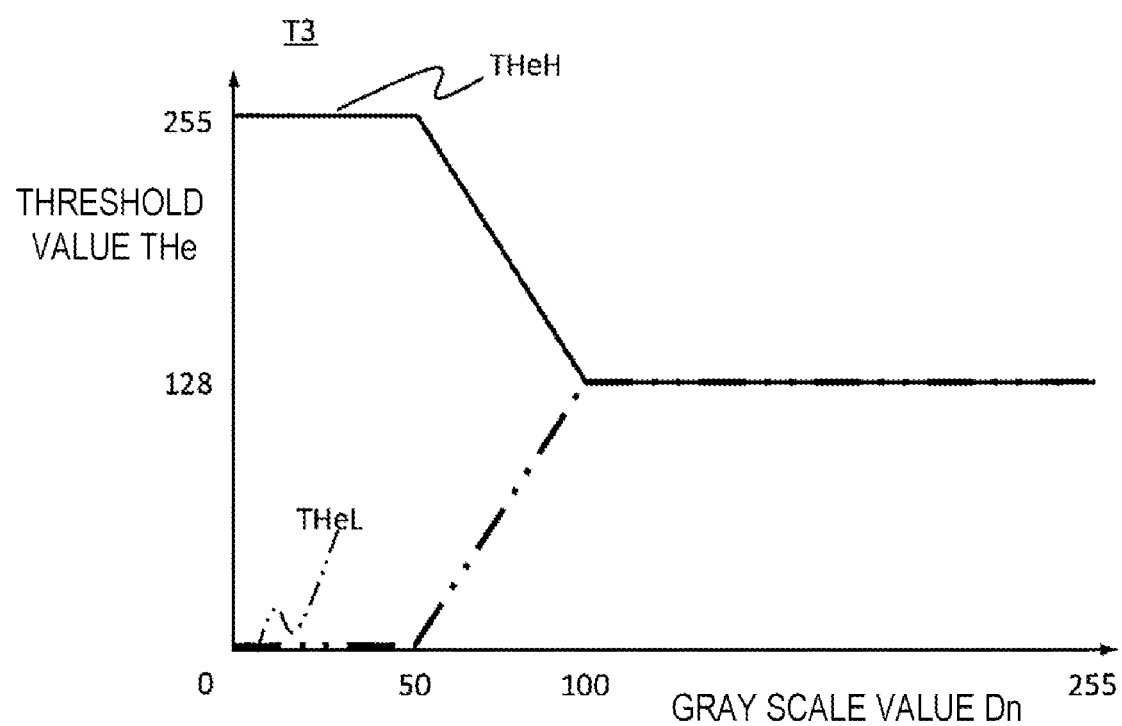
FIG. 7 is a diagram showing a third threshold value table.

FIG. 7 illustrates a threshold value table. The view in FIG. 7 is the same as that in FIGS. 5 and 6. The threshold value table illustrated in FIG. 7 is referred to as a third threshold value table T3.

Differences between the third threshold value table T3 and the first threshold value table T1 will be described. According to the third threshold value table T3, in an intermediate gray scale range that exceeds the low gray scale range to approximately Dn=100, the high threshold value THeH gradually decreases from the maximum value of 255 toward 128 as the gray scale value Dn increases. On the other hand, the low threshold value THeL gradually increases from the minimum value of 0 toward 128 as the gray scale value Dn increases. Then, in the gray scale range exceeding the intermediate gray scale range, the high value THeH is the same as the low threshold value THeL, and is 128.

At step S200, when the designated recording mode corresponds to the first recording mode, the recording data generation unit 12b may select the third threshold value table T3 instead of selecting the first threshold value table T1. According to the third threshold value table T3, in the intermediate gray scale range, since the threshold value difference changes from the maximum value of 255 toward the minimum value of 0, in this intermediate gray scale range, the degree of impact of the dither processing in the combined HT process gradually decreases. In other words, by selecting the third threshold value table T3 in accordance with the first recording mode, with respect to the intermediate gray scale range that is part of the gray scale range of the recording excluding the low gray scale range and that continues from the low gray scale range, the first combined HT process applies the HT processing that lessens the impact of the dither method in response to the increase in the gray scale and strengthens the impact of the error diffusion method.

In addition to this, for example, it is also possible to assume a threshold value table that has the reverse characteristics of the first threshold value table T1 or the third threshold value table T3. In other words, a given threshold value table causes the threshold value difference to be zero in the low gray scale range, and increases the threshold difference value by causing the high threshold value THeH to be 255 and the low threshold value THeL to be zero in the intermediate gray scale range that exceeds the low gray scale range, or causes the high threshold value THeH to be 255 and the low threshold value THeL to be zero in the entire range exceeding the low gray scale range.

Further, in the threshold value table, the upper limit of the high threshold value THeH may be a value that is lower by a predetermined extent than the maximum value of 255, such as approximately 240, for example, and the lower limit of the low threshold value THeL may be a value that is a value that higher by a predetermined extent that the minimum value of zero, such as approximately 15, for example. In this manner, in the present embodiment, by preparing various threshold value tables, the control unit 11 is capable of performing the plurality of combined HT processes, in each of which the plurality of HT processes are combined in a different combination.

As described above, the classification of the recording mode depending on the degree of landing error need not necessarily be limited to the two types of the first recording mode and the second recording mode. For example, a "third recording mode" in which the landing error is greater than in the first recording mode and the landing error is smaller than in the second recording mode may be assumed. Then, at step S140, when the designated recording mode corresponds to the third recording mode, the recording data generation unit 12b selects a threshold value table that is different from the threshold value tables selected in correspondence to the first recording mode or second recording mode, and performs the combined HT process.

4. Conclusion

In this manner, according to the embodiment, the recording device 10 is provided with the recording head 19 including the plurality of nozzles 20 capable of discharging the liquid onto the medium 30, and with the control unit 11 that controls the discharge of the liquid by the recording head 19 based on the recording data. The control unit 11 can execute the plurality of combined HT processes, the combined HT process being a combination of the plurality of HT processes and the plurality of combined HT processes being different from each other in mode of the combination of the plurality of HT processes. When performing the recording on the medium by executing the recording mode designated from among the plurality of recording modes having different degrees of error in landing position of dots of the liquid on the medium 30, the control unit 11 selects the combined HT process, from among the plurality of combined HT processes, in accordance with the designated recording mode, and executes the selected combined HT process to generate the recording data.

According to the configuration, the control unit 11 selects the combined HT process from among the plurality of combined HT processes in accordance with the designated recording mode. In this way, it is possible to select the appropriate combined HT process from the viewpoint of the image quality and generate the recording data, using the relationship with the degree of landing error by the designated recording mode. Thus, it is possible to provide a recording result of a good image quality, regardless of the degree of landing error by the designated recording mode.

Further, according to the embodiment, in accordance with the predetermined first recording mode having the relatively small error, the control unit 11 may select the first combined HT process that applies the HT process using the dithering technique to the low gray scale range of the recording and applies the HT process using the error diffusion technique to the gray scale range excluding the low gray scale range, and, in accordance with the predetermined second recording mode having the relatively large error, may select the second combined HT process that applies the HT process using the dithering technique to the entire gray scale range of the recording.

According to the configuration, both when executing the first recording mode and performing the recording on the medium 30, and executing the second recording mode and performing the recording on the medium 30, the control unit 11 selects the appropriate combined HT process for the respective recording mode and generates the recording data. Therefore, in both the first recording mode and the second recording mode, the recording result of the good image quality can be provided.

Further, according to the embodiment, with respect to the intermediate gray scale range that is a part of the gray scale range excluding the low gray scale range and that continues from the low gray scale range, the first combined HT process may apply the HT process with which the impact of the dithering technique is lessened and the impact of the error diffusion technique is strengthened as the gray scale increases. According to the configuration, in the first combined HT process, by using the HT process with respect to the intermediate gray scale range, the control unit 11 can smoothly join the HT process using the dithering technique with respect to the low gray scale range and the HT process using the error diffusion technique with respect to the gray scale range other than the low gray scale range, and can thus alleviate a sudden change in the image quality due to switching the type of the HT process.

Further, according to the embodiment, the difference between the plurality of recording modes may be a difference in the number of passes of the recording head 19 performed with respect to the medium 30.

According to the configuration, in a situation in which the degree of landing error is different due to the difference in the number of passes performed for performing the recording on the medium 30, the control unit 11 can select the appropriate combined HT process in accordance with each of the recording modes having the different number of passes, and can generate the recording data.

The embodiment is not limited to a device or a system, and a variety of categories of disclosure are disclosed, such as a method performed by the device or the system, and the program 12 that causes a processor to execute the method. According to the embodiment, a recording method that causes the recording head 19, which includes the plurality of nozzles 20 capable of discharging the liquid onto the medium 30, to perform the recording by discharging the liquid based on the recording data includes a recording control step for performing the recording on the medium 30 by executing the recording mode designated from among the plurality of recording modes having different degrees of error in landing position of dots of the liquid on the medium 30. Then, in the recording control step, the combined HT process is selected from among the plurality of combined HT processes in accordance with the designated recording mode, the combined HT process being a combination of the plurality of HT processes and the plurality of combined HT processes being different from each other in mode of the combination of the plurality of HT processes, and the recording data is generated by executing the selected combined HT process. According to FIG. 3, for example, steps S140 and S150 correspond to the recording control step.

The correspondence between the recording mode and the threshold value table may be determined in advance based on the recording result of a predetermined test pattern used for image quality evaluation. In other words, the recording device 10 uses a combination of a given recording mode and a given threshold value table and records the test pattern on the medium 30 after generating the recording data by the combined HT process. The recording of such a test pattern is performed for various combinations of the recording mode and the threshold value table. As a result, for each of the recording modes, the recording device 10 associates the threshold value table used for recording the test pattern in which the good image quality is obtained, based on user evaluation, for example, and stores this correspondence relationship. Thereafter, it is sufficient for the control unit 11 to refer to the correspondence relationship, select the threshold value table in accordance with the designated recording mode, and execute the combined HT process.

The plurality of HT processes for generating the recording data are not limited to the HT process using the dithering technique and the HT process using the error diffusion technique. For example, it is possible to employ algorithms for various HT processes other than the dithering technique or the error diffusion technique, such as an HT process using an AM screen.

In addition to the reciprocating movement along the main scanning direction D1, the carriage 18 may be configured to be able to perform a reciprocating movement along the transport direction D2 that intersects the main scanning direction D1. In other words, a configuration may be adopted in which the carriage 18 moves in two dimensions in a plane parallel to the surface of the medium 30 that is stationary, and thus performs the recording on the medium 30. Further, the recording device 10 may have a configuration that does not include the carriage 18. In other words, a configuration may be adopted in which the recording head 19 is stationary on the transport path by the transport unit 17, and is a so-called line-type head in which the nozzles are not aligned in the direction D2 as illustrated in FIG. 2, but are aligned in the direction D1, and the recording head 19 performs the recording by discharging the liquid onto the medium 30 as the medium 30 passes below the recording head 19.

What is claimed is:

1. A recording device, comprising:
    a recording head including a plurality of nozzles configured to discharge a liquid onto a medium; and
    a control unit configured to control the discharge of the liquid by the recording head based on recording data, wherein
    the control unit is configured to execute a plurality of combined halftone processes, the combined halftone process being a combination of a plurality of halftone processes and the plurality of combined halftone processes being different from each other in mode of the combination of the plurality of halftone processes, and
    when performing recording on the medium by executing a recording mode designated from among a plurality of the recording modes having different degrees of error in landing position of dots of the liquid on the medium, the control unit selects the combined halftone process, from among the plurality of combined halftone processes, in accordance with the designated recording mode, and executes the selected combined halftone process to generate the recording data.

2. The recording device according to claim 1, wherein
    in accordance with a predetermined first recording mode having a relatively small error, the control unit selects a first combined halftone process in which a halftone process using a dithering technique is applied to a low gray scale range of a recording and a halftone process using an error diffusion technique is applied to a gray scale range excluding the low gray scale range and
    in accordance with a predetermined second recording mode having a relatively large error, the control unit selects a second combined halftone process in which the halftone process using the dithering technique is applied to an entire gray scale range of the recording.

3. The recording device according to claim 2, wherein
    with respect to an intermediate gray scale range, the first combined halftone process applies a halftone process in which an impact of the dithering technique is lessened and an impact of the error diffusion technique is strengthened as a gray scale increases, the intermediate gray scale range being a part of the gray scale range excluding the low gray scale range and continuing from the low gray scale range.

4. The recording device according to claim 1, wherein
    a difference between the plurality of recording modes is a difference in the number of a pass of the recording head performed with respect to the medium.

5. A recording method for performing recording by causing a recording head including a plurality of nozzles configured to discharge a liquid onto a medium to discharge the liquid based on recording data, the recording method comprising
    a recording control step for performing the recording on the medium by executing a recording mode designated from among a plurality of the recording modes having different degrees of error in landing position of dots of the liquid on the medium, wherein
    the recording control step includes:
        selecting a combined halftone process from among a plurality of combined halftone processes in accordance with the designated recording mode, the combined halftone process being a combination of a plurality of halftone processes and the plurality of combined halftone processes being different from each other in mode of the combination of the plurality of halftone processes, and
        executing the selected combined halftone process to generate the recording data.

* * * * *